April 23, 1963
A. FIBISH
3,086,822
CUP STACKING MACHINE
Filed June 27, 1960
5 Sheets-Sheet 1
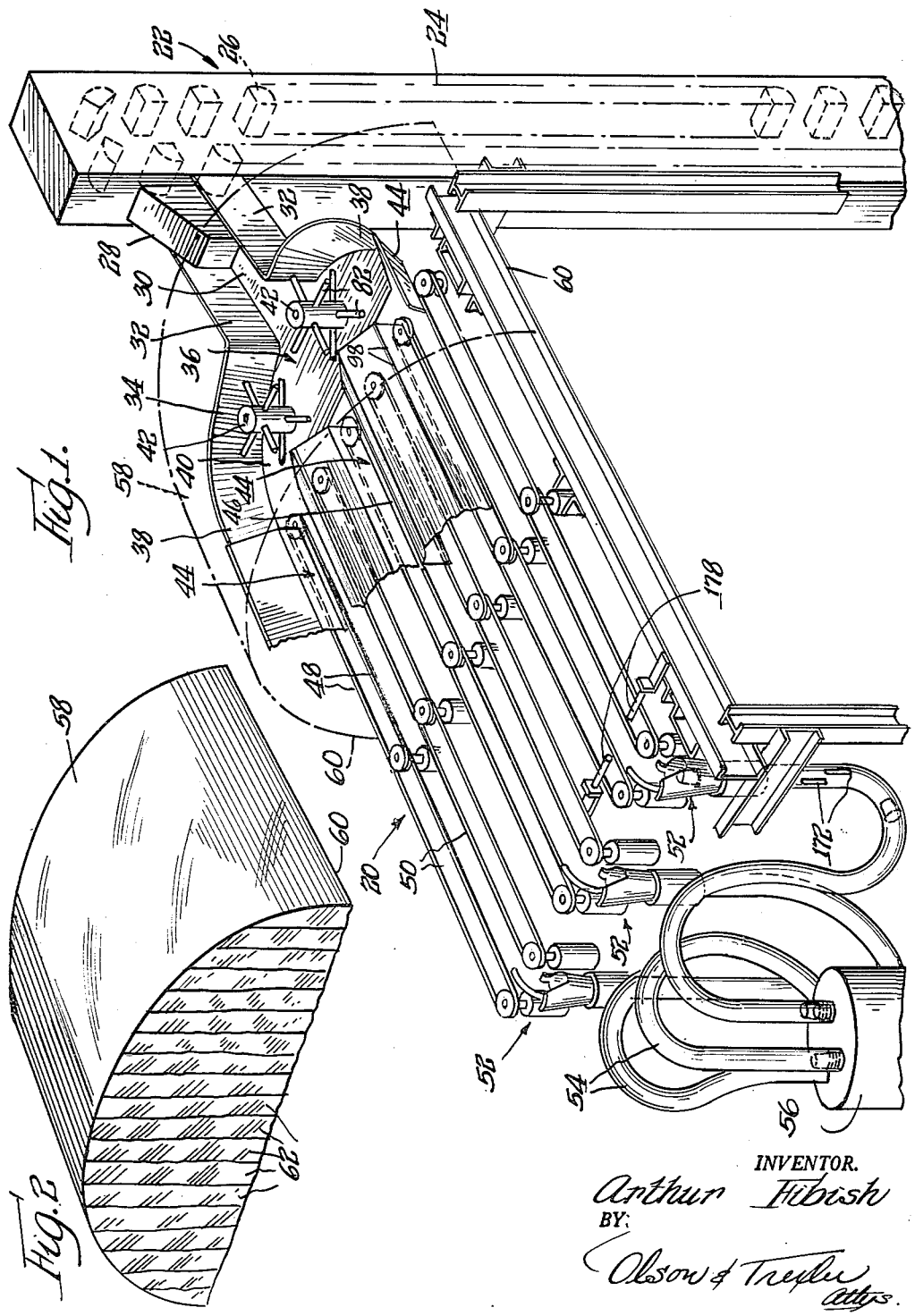
INVENTOR.
Arthur Fibish
BY
Olson & Trexler
attys.

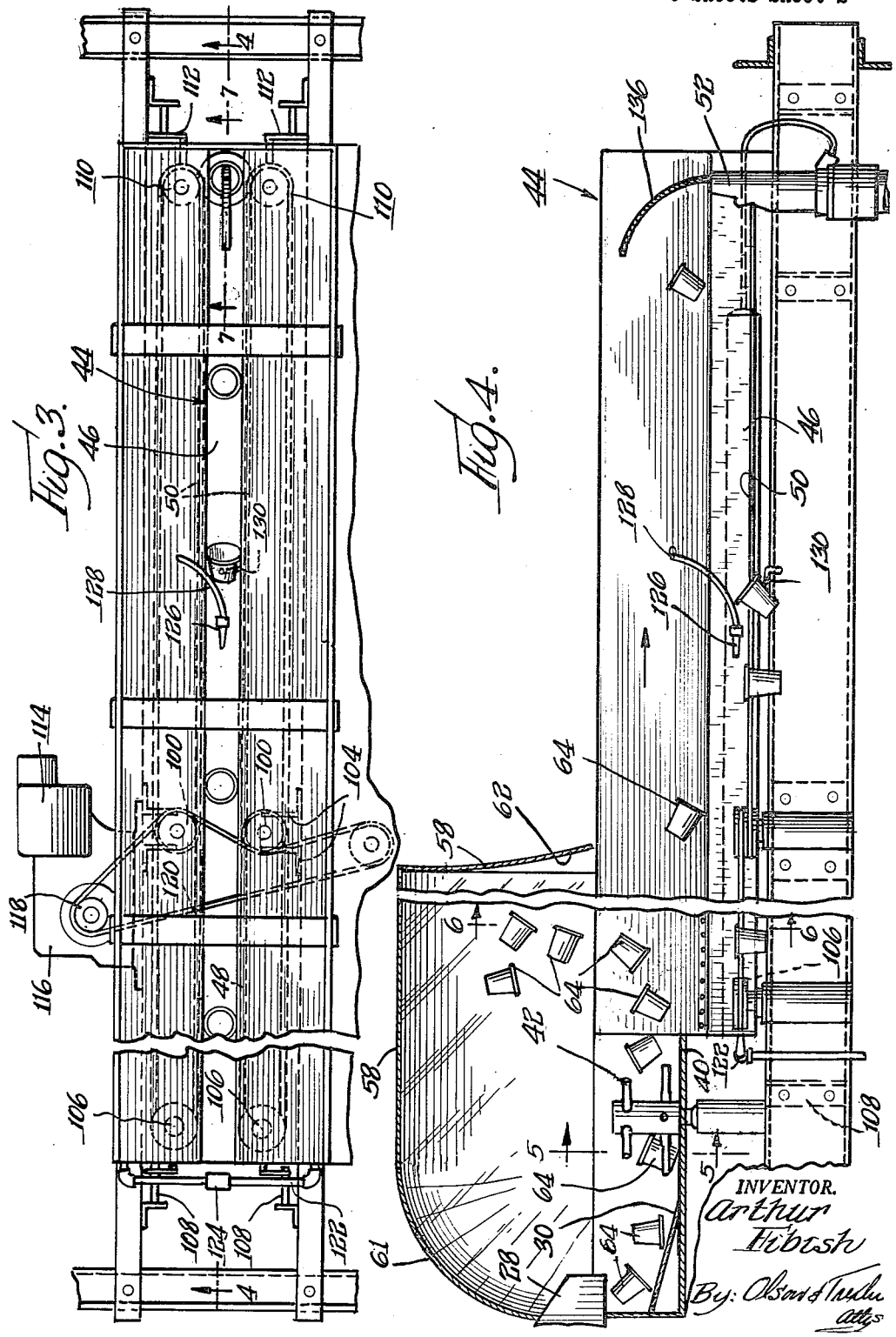

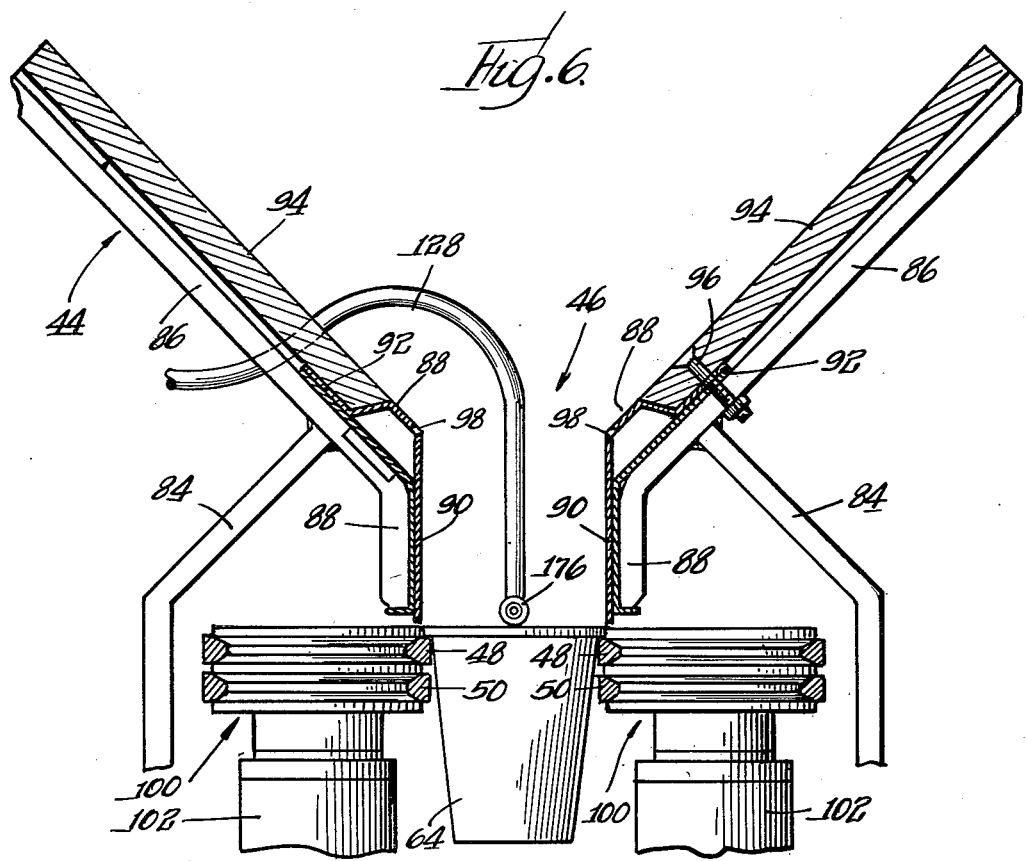
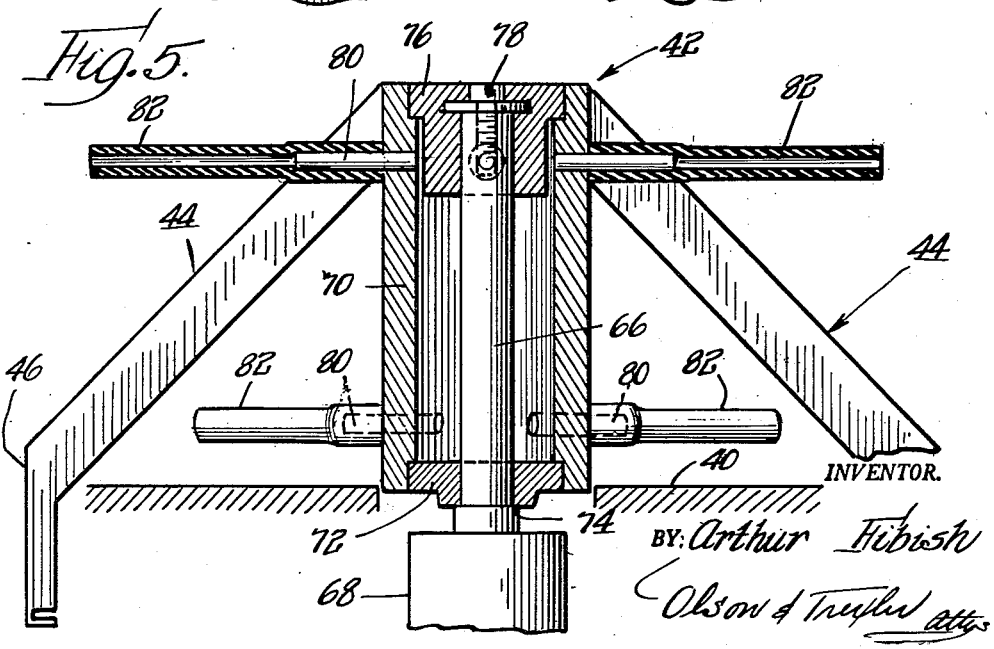

April 23, 1963 A. FIBISH 3,086,822
CUP STACKING MACHINE
Filed June 27, 1960 5 Sheets-Sheet 4

INVENTOR.
Arthur Fibish
BY
Olson & Trexler
Attys.

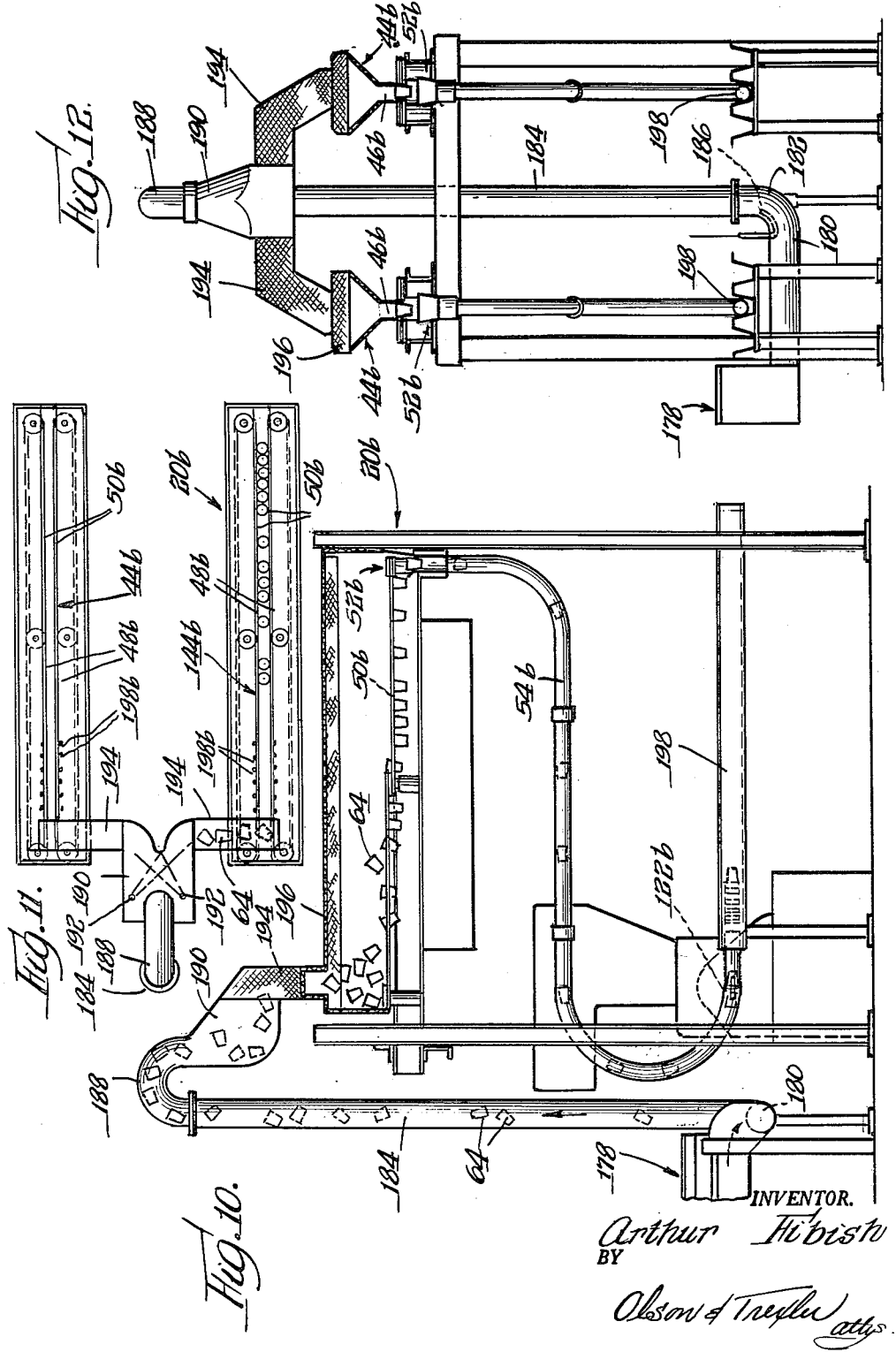

United States Patent Office 3,086,822
Patented Apr. 23, 1963

3,086,822
CUP STACKING MACHINE
Arthur Fibish, Prospect Heights, Ill., assignor to Illinois Tool Works Inc., a corporation of Delaware
Filed June 27, 1960, Ser. No. 39,009
34 Claims. (Cl. 302—2)

This invention is concerned with the manufacture of lightweight cups of sheet material, specifically plastic, and more particularly with a machine for orienting such cups.

According to one process of manufacturing cups of sheet plastic material, a sheet or web of plastic material is heated to a plastic temperature. The sheet is then stretched by a male mandrel into a female mold, clamped in place, and finally subjected to differential air pressure to expand the sheet plastic material against the inside of the female mold. The cup or the like is then severed from the remainder of the sheet, and is ejected from the female mold. Preferably, a plurality of cups is formed at the same time in adjacent molds. The cups or the like, as ejected from the molds, fall in random position into a container. Subsequently, the cups are fed through a rim rolling machine to form rolled under rims at the upper edges of the cups. The cups must be fed into the rim rolling machine in a predetermined position, and preferably in stacked, telescoped relation.

Accordingly, it is an object of this invention to provide a machine for orienting plastic cups and the like in a predetermined manner.

It is another object of this invention to provide a machine for positioning open ended containers, such as cups, of lightweight construction in accordance with the open ends thereof.

It is yet another object of this invention to provide a machine for orienting cups or the like, which machine is provided with conveying means for receiving cups in one predetermined position only.

More specifically, it is an object of this invention to provide a machine for orienting lightweight plastic cups and the like wherein air jets prevent passage of all cups except those in one predetermined position.

It is another object of this invention to provide a novel conveying or transporting mechanism for lightweight cups of plastic and the like and for delivering such cups in predetermined position irrespective of the position of the cups as delivered to the conveying machine.

Still a further object of the present invention is to provide a machine having a conveying mechanism for cups and the like containers, which conveying mechanism has provision for spacing the cups in predetermined manner.

Other and further objects and advantages of the present invention will be apparent from the following description when taken in connection with the accompanying drawings wherein:

FIG. 1 is a somewhat stylized perspective view of a machine constructed in accordance with the principles of this invention;

FIG. 2 is a perspective view of a hood forming a part of the machine, and shown only in dashed lines in FIG 1;

FIG. 3 is a top view of one conveyor section or trough of the machine;

FIG. 4 is a longitudinal sectional view therethrough as taken substantially along the line 4—4 in FIG. 3;

FIG. 5 is a cross-sectional view on an enlarged scale through the initial sorting station as taken along the line 5—5 in FIG. 4;

FIG. 6 is a cross-sectional view through one of the trough or conveyor sections as taken along the line 6—6 in FIG. 4;

FIG. 7a is a fragmentary detail view of a modification similar to a part of FIG. 7;

FIG. 10 is a somewhat schematic side view of a modification of the machine;

FIG. 11 is a top view thereof; and

FIG. 12 is an end view thereof.

Figure 7:
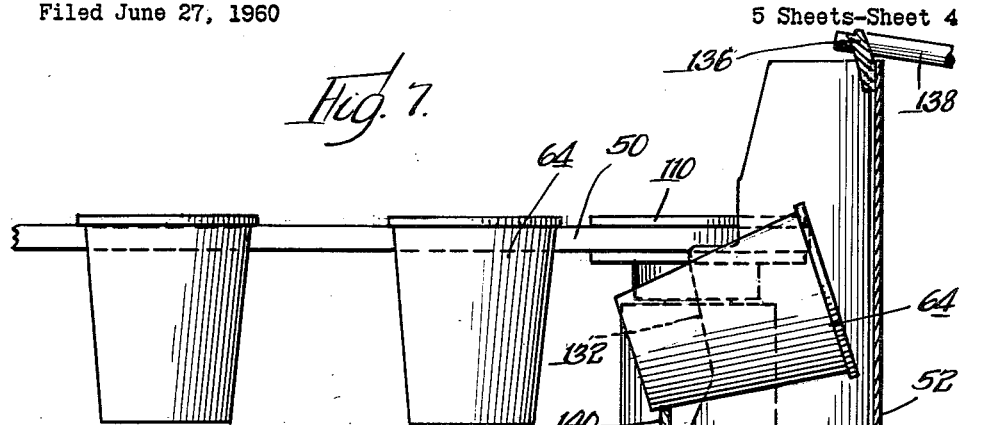
FIG. 7 is a longitudinal sectional view on an enlarged scale through the discharge end of the machine as taken substantially along the line 7—7 in FIG. 3.

Reference should be had first to FIG. 1 for an understanding of the general layout of the machine. The orienting machine is designated generally by the numeral 20 and includes an elevator mechanism 22 comprising a vertically elongated rectangular tube or housing 24 having conveyor pockets or scoops 26 therein mounted on an endless belt (not shown). Thin wall plastic cups of the nature shown in Edwards U.S. Patent 2,905,350 (or other cup-like containers having an open end, and of relatively lightweight construction) are supplied in random fashion to the bottom end of the elevator mechanism (not shown) and are picked up by the pockets or scoops 26 of the elevator mechanism. Several cups are received in each pocket or scoop.

Cups or the like are passed from the elevator mechanism through a hood 28 on to an inclined feed floor or chute 30, having confining walls 32 along the opposite ends thereof. These walls are deflected out at 34 about an initial divider or separating area 36, and continue along the sides of this area at 38.

The cups are moved along a floor 40 in the initial divider or separator area 36, and are divided or separated by a pair of mechanical separators 42 and then are fed into troughs 44. Three such troughs are illustrated, but it will be apparent that this number is for exemplary purposes only.

The troughs 44 are similar in nature, and each is of more or less V-shaped configuration, having an open bottom channel 46 with first and second belts 48 and 50 extending therethrough. Each trough 44 and the secondary feed belts 50 associated therewith lead to a discharge mechanism 52. The discharge stations or mechanisms 52 respectively lead through pneumatic conveyor tubes 54 to a rim rolling machine 56.

In addition to the foregoing, there is a thin, flexible shroud or canopy 58 (see also FIG. 2) overlying the initial divider or separator area 36, and also overlying the inlet ends of the troughs 44. The canopy 58 preferably is made of sheet polyethylene, and is secured along the opposite longitudinal edges of the machine as at 60. The polyethylene shroud 58 preferably possesses sufficient rigidity to be self supporting. However, it can also be provided with supporting ribs or bands, and it further is supported by air pressure beneath it as will be apparent hereinafter. The shroud is open at the downstream end and the upstream end is curved down at 61 to connect to the walls 32. The open end is provided with depending flexible polyethylene strips 62. As air under pressure is supplied beneath the shroud 58, the strips 62 are blown out in the downstream opposite direction to allow air to escape from beneath and from among them. In addition, the strips allow re-entry of returned cups into the area beneath the shroud, as also will be apparent hereinafter.

Reference now should be had to FIGS. 3–6 for an understanding of some of the operational details of the machine. Cups 64 which are discharged by the elevator mechanism 22 on to the ramp or floor 30 pass down on to the floor at the initial separating stations 40. As noted heretofore, there are two separators 42 at this station. These separators are shown in detail in FIG. 5, and each includes a central rod or spindle 66 rotatably carried by suitable bearing means 68 below the floor. The spindle is rotated in each instance, either by an independent motor drive, or by suitable belting or gearing to other drive mechanisms, all in accordance with conventional practice. A cylinder 70 is supported in spaced relation coaxial with the spindle 66 by a bottom end plug 72 which is bottomed against a shoulder 74 on the spindle, and by a top end plug 76 which is secured by means such as a bolt and washer 78 to the top of the spindle. The cylinder is provided near the lower end thereof with four radially extending pins 80 disposed 90° apart. Similar pins 80 are provided near the top of the cylinder, but these pins are offset 45° rotationally relative to the lower pins. A relatively long, soft and very flexible rubber tube 82 is supported on each pin 80 and extends radially therefrom.

The two dividers 42, as may be seen in FIG. 1, are spaced apart a sufficient distance to allow some cups to pass between them into the central trough 44. Others of the cups are picked up by the arms 82 of the dividers, and are carried along more or less constrained by the arcuate walls 34 into the outside troughs 44. To this end, it will be understood that the divider 42 disposed to the right in FIG. 1 rotates in a clockwise direction as viewed from above, while the divider on the left side as viewed in FIG. 1 rotates in a counterclockwise direction as viewed from above.

Thus, the cups tend to pass into the troughs 44 and to drop into the throats 46 thereof. The construction of the troughs is seen better in FIG. 6, wherein brackets 84 will be seen to support angularly disposed steel plates 86 having short vertically depending flanges 88 thereon. Sheet metal manifolds 88 of more or less trapezoidal cross-section are supported substantially at the bend or apex of each plate 86. These manifolds include depending sheets 90 forming the throat area 46 of each trough, and also include diagonally upwardly extending flanges 92 lying against the plates 86. Boards 94 overlie the upper portions of the manifolds 88 and the flanges 92 thereof, an dare secured against the plates 86 by means such as nuts and bolts 96, at least some of which also pass through the manifold flanges 92 for mounting thereof. In the area beneath the shroud 58 and depending strips 62 the manifolds 88 are provided with apertures 98. These apertures are at the entrance to the throat area 46, and are angled slightly upwards.

Referring now to FIGS. 3, 4 and 6, there will be seen more or less midway from end to end of each trough a pair of double drive pulleys 100 supported immediately below the throat section 46 of each trough. The pulleys respectively receive the belts 48 and 50. The pulleys are rotatable on mounts 102 supported by brackets 104 fixed on the machine frame. The opposite ends of the belts 48 are supported by idler pulleys 106 which are supported by adjustable brackets 108 on the machine frame. Similarly, the belts 50 at the opposite ends are supported by idler pulleys 110 which are supported by adjustable brackets 112 on the machine frame.

The right hand trough, as viewed from the discharge end of the machine, is provided to the right side thereof and longitudinally near the mid-section with a motor 114 and speed reducer 116 driving a gear 118. A chain 120 is passed over the gear 118, and also meshes with gears on the bottom ends of the shafts of the pulleys 100, in such manner as to drive these pulleys counter-rotating. The chain 120 also drives at least the adjacent pulley of the center trough. A similar drive mechanism is provided on the left side of the machine for driving the pulleys associated with the left trough. Preferably, both belts of the central trough are driven by a common chain or belt so that they will drive the respective belts 48 and 50 in proper timed relation.

The reaches of the belts 48 and 50 are provided with suitable back up members (not shown) and are spaced apart just far enough to support a cup in upright position as shown in FIG. 6, the belt engaging just beneath the rim of the cup. As the cups 64 pass from the belts 48 to the belts 50, they necessarily drop a short distance, but the distance is substantially limited. Air under pressure is supplied to the manifold 88 by suitable means (not shown) and exits through the apertures 98 beneath the shroud 58, more or less in an upwards direction. Thus, there is provided an area of upwards agitation in the vicinity where the cups are received from the initial separator stage 40. In addition, a manifold pipe 122 extends across the entrance end of the throat of each trough 48, and is provided with means 124 providing a jet of air in a downstream direction through the throat 46, whereby to preclude the formation of a dead space or pocket.

Cups 64 which by chance are more or less bottom down when leaving the separators 42 pass into the troughs 44 and drop down into the throats 46 where they are carried by the belts 48. Cups which are not bottom down present a rather substantial resistance to air flow, and are blown upwards beneath the shroud 58 as shown in FIG. 4. As will be understood, the cups, being made of sheet plastic or the like, are quite light in weight and are thus readily blown up when air gets within a downturned open upper end. The air is sufficiently turbulent, and the chances of a cup being exactly upside down being very low, the cups tossed up into the air by the upward air streams from the jets 98 tip over and eventually come back down bottom first, and are received by the belts 48, and are conveyed out of the shroud past the depending ribbons 62.

It is possible that some cups which are not oriented right side up might land on top of other cups carried by the belts, and be carried along thereby. This is particularly true of several cups that should happen to fall through the same area at substantially the same time, whereby not all of the cups would receive the full benefit of the upwardly directed turbulent air stream. Furthermore, it is possible that cups carried by the belts might accidentally end up in telescoped, nested relation. Within limits, this is permissible. However, to take care of a telescoped stack of cups more than three cups high, and to take care of cups which are not properly oriented, there is provided at a downstream location, somewhat beyond the center of each trough, a nozzle 126 oriented directly upstream, and provided with air under pressure through a conduit or tube 128. Each nozzle 126 is positioned high enough to clear three nested cups, but not sufficiently high to clear more than three nested cups. Thus, improperly oriented cups, or cups which are piled too high are blown back upstream. Some of these cups may fall within the trough in a sufficiently upright position to be caught and carried upright by the belts. Others of such blown back cups will pass back beneath the shroud 58, readily entering through the depending ribbons 62, and will be caught by the upwardly moving turbulent air, and properly oriented in the manner heretofore described.

As will presently appear, it is necessary that the cups carried by the belts 48 and 50 be spaced apart a minimum distance at the discharge end of the machine. Accordingly, immediately downstream from the blow-back nozzle 126 and slightly below the level of the belts 50 there is provided a spreader finger 130. As each cup engages this finger, (see FIG. 4) it is tipped up, and thereby rides over the finger. Such tipping up causes the cup to bump any immediately trailing cup back upstream a slight distance. Thus, all of the cups are spaced apart a predetermined minimum distance.

At the discharge end of the machine, the cups pass from the belts 50 into the funnels 52, see FIGS. 1, 4 and 7–9. Each funnel 52 is open at the top, and is cut away at the front side thereof as at 132 to provide for entrance of a cup thereinto. A partially enveloping wing or flange 134 at the top of the funnel extends above the tops of the belts 50.

An arcuate deflector 136 curves upwardly and back upstream from the top of the lip or flange 134 for purposes which will shortly become apparent. In addition, a second blow-back nozzle or pipe 138 extends between the arcuate deflector member 136 and the top of the wing, flange or lip 134. In spite of the orienting of cups which has occured upstream of the discharge end of the machine, it is possible that cups might arrive at the discharge end of the machine which are not properly oriented and carried by the belts 50. For example, some cups might be piled on top of one another. Such improperly oriented cups are blown back by the second blow-back nozzle or pipe 138. They may fall in proper position into place between the belts in an upstream location, and if not they are caught by the jet of air from the nozzle 126, and returned beneath the shroud, as discussed heretofore.

At the entering end of the funnel 52 associated with each trough, there is provided a flipper member 140 which projects up into the path of the cups so as to engage the sidewalls thereof near the bottoms thereof. This causes the cups to tip over toward an upside down position, as shown in FIG. 7. There is normally a suction provided within the funnel, as will presently appear, and this suction causes the cups to complete inversion, and to go down through the funnel open end first, and into the transfer tubes 54.

Suction in the funnel 52 is provided by a Venturi 142 immediately below the funnel. The Venturi comprises a cylinder 144 having an internally tapered bore slightly reducing the cross-sectional area from the funnel as at 146. The bottom edge of the cylinder is externally bevelled as at 148. A subjacent cylinder 150 is sealed to a circumferential flange 152 on the cylinder 144 as by means of a gasket 154. The subjacent cylinder 150 is counterbored at 156 and bevelled at 158 whereby to provide with the bevelled edge 148 of the first mentioned cylinder an annular air chamber or manifold 160 opening downwardly into the bore 162 of the cylinder 150 through an annular opening 164. A fitting 166 is provided on the subjacent cylinder near the upper edge thereof, and receives an air supply tube or the like 168. A transversely upward bore 170 extends from the tube 168 to the annular air chamber or manifold 160.

Thus, air is blown annularly down into the subjacent cylinder 150, and hence into each of the tubes 54. This creates a vacuum in the funnels 52, whereby the cups are pulled down past the Venturi air entrance ring 164. From this point on, the cups are blown ahead, and in this connection it will be noted in FIG. 1 that the tubes 54 desirably are provided with pressure relief slots 172 which are rotationally offset from one another to provide swirling or rifling of the air columns in the tubes. These slots are necessary to allow development of a satisfactory vacuum in the funnel area without propelling the cups along through the tubes at too fast a rate.

A modification of the Venturi arrangement is shown at 142a in FIG. 7a. The parts are the same as heretofore shown and described, and similar parts are identified by similar numerals, repetition of description therefore being unnecessary. As will be apparent, the suffix a has been added to the numerals in FIG. 7a. The modification exists in the provision of skewed grooves on the bevelled portion 148 on the outside of the cylinder 144a and leading from the annular air chamber or manifold 160a downwardly into the bore 162a of the subjacent cylinder 150a. A swirling motion thus is imparted to the air in the Venturi area which spins the cups about their axes and facilitates transfer thereof without undue wear on any particular location thereof.

Figure 8:
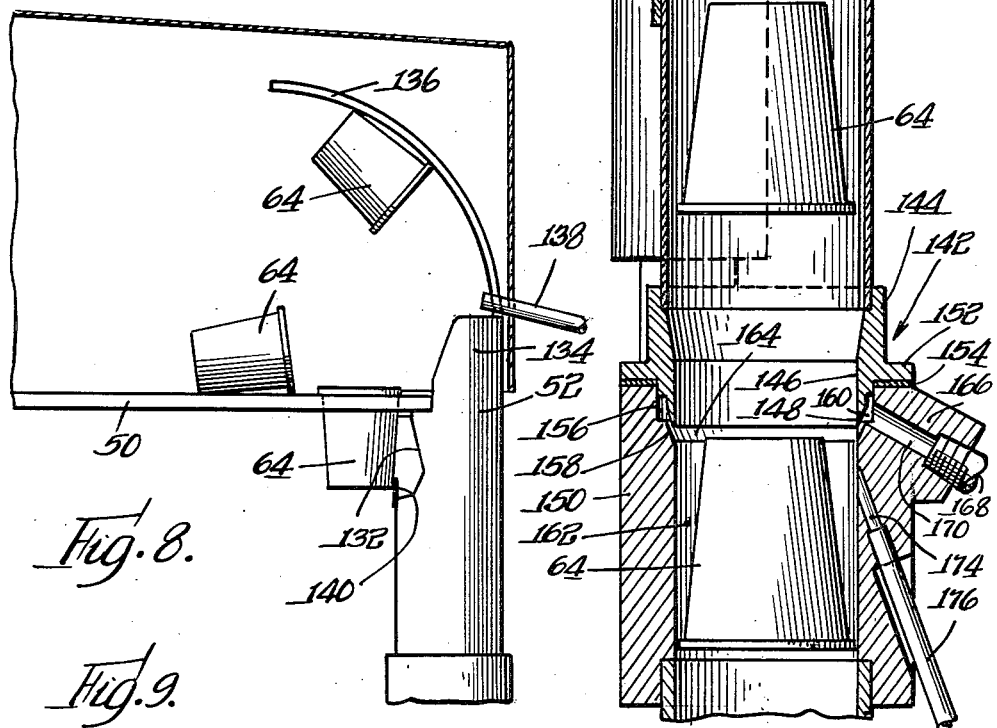
FIG. 8 is a fragmentary detail view corresponding to a portion of FIG. 7.
Figure 9:
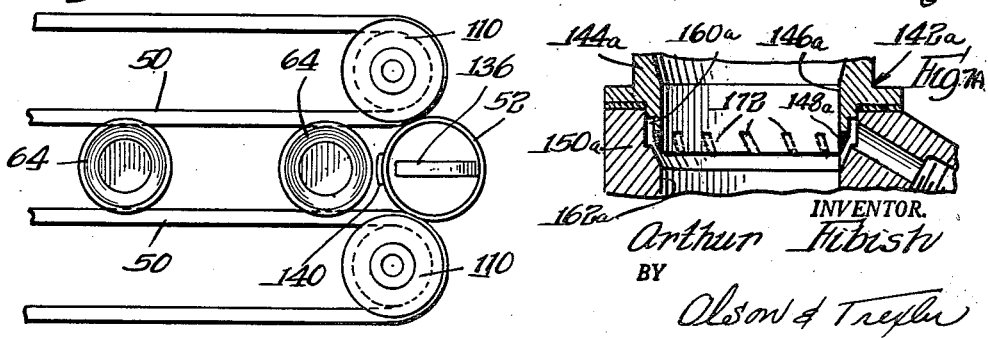
FIG. 9 is a top view of the portion of the machine shown in FIG. 8.

Immediately below the Venturi in FIG. 7, it will be observed that there is an angularly upwardly directed bore 174 communicating with an external air pressure supply tube 176. In addition, there will be observed in FIG. 1 a photocell detector apparatus 178. The photocell is connected through suitable external wiring (not shown) to effect shutting off of the air supply to the Venturi, and to supply air under pressure to the angularly upwardly directed bore 174. Thus, there is normally a suction in the funnel, but if a large number of cups should pile up, such as might be caused by a jam-up at the entrance of a funnel, the photocell apparatus would eliminate the suction in the funnel, and apply a strong upward pressure, whereby to blow cups out of the funnel area. Such blown out cups would engage the deflector 136, as shown in FIG. 8, whereby the cups would be thrown strongly back toward the first blow-back nozzle 126. Such action of course is augmented by the second blow-back nozzle 138. The cups are then reoriented in accordance with the procedure heretofore set forth.

Many of the dimensions of the machine can be scaled rather closely from the dimensions of the cup which, typically is about 3.1 inches in height, and about 2.9 inches in diameter across the outside of the rim or lip at the open mouth of the cup. The air outlets or jets 98 in the manifolds 88 are below $\frac{1}{32}$ inch in diameter. In the specific illustrative example of the invention, there are approximately 40 holes on $\frac{3}{4}$ inch centers on each side of each trough. The angle of the holes above the horizontal is not too critical, except that they must not exit at any angle below horizontal. In fact, it has been found preferable to have some of the holes at somewhat different angles. It will be observed that there is an upward component to the air jets, due to their typically being directed above the horizontal, and that the jets are in opposition to each other, thereby producing further upward air movement, which movement is also rather turbulent.

It has been noted that in the exemplary embodiment of the machine, there are approximately forty of the holes 98 on $\frac{3}{4}$ inch centers. This bears some relation to the height of the cup and it generally has been found that the distance along which the holes extend should be about ten times the length of the cup for best results. Thus, the number and spacing of holes may vary somewhat for cups of different sizes.

The height of the throat 46 is also generally related to the cup height, in that it is preferred that the throat height be not less than the height of an individual cup. Thus, once a cup has entered the throat area, it will not be kicked back up into the turbulent air when it first engages the belt.

The rubber tubing 82 on the separators or dividers is, by way of example, of $\frac{5}{8}$ inch outside diameter. The lengths of the pieces of tubing are not uniform, and the lengths are determined experimentally in order to produce as uniform a distribution as possible with any given size of cup.

In the exemplary machine, there is a drop of about $\frac{3}{8}$ of an inch from the belts 48 to the belts 50. This drop plays an active part in adjusting a cup that might be misoriented as it is carried by the belts 48. Aside from dropping from one set of belts to the next, the belts do provide a certain amount of orientation of the cups, in that cups which land on the belts in a more or less horizontal position will tend to tip over, with the rims supported on the tops of the belts, whereby the cups attain an upright position. Furthermore, should a malformed cup happen to be fed into the machine, it will generally fall through the space between the belts and hence out of the machine. Further orientation in the throat area adjacent and above the belts is afforded by air inspired up through the throat by the upward jets 98. This provides a non-turbulent upward area beneath the turbulent area.

As shown, the cups are stacked at the top of the rim roller as they are discharged from the machine 20. Obviously, the cups could simply be stacked without being fed into the rim rolling machine. Furthermore, in some installations it is contemplated that the rim rolling machine 56 would be directly below the discharge or outlet end of the machine, the tubes 54 thereby being omitted. It is also contemplated that the cups could be fed into the machine on a level therewith, as direct from a forming machine, in which case the elevator mechanism 22 would be unnecessary. In fact, it is entirely possible that a gravitational feed chute could be provided to feed the cups in random array from a higher elevation to the orienting machine 20.

A modification of the invention is shown in FIGS. 10–12. Much of the invention is similar in these figures to what has been described heretofore, and similar numerals are utilized with the addition of the suffix b to indicate similar parts. The major difference in the modification of the invention resides in the use of pneumatic elevation of the cups, and initial pneumatic separation.

Thus, in FIGS. 10–12, cups 64, as heretofore described, are received from suitable handling and inspection apparatus indicated generally at 178 in a horizontal conveyor tube section 180. The horizontal conveyor tube section is connected by an elbow 182 to a vertical tube section or elevator 184. An air jet 186 is upwardly directed on the inside bend of the elbow 182. This air jet creates a vacuum at the entrance to the horizontal tube section whereby to draw cups into the tube section. In addition, it provides an upward blast for blowing cups up through the elevator tube 184. As will be apparent, the tubes are substantially larger in diameter than the maximum diameter of a cup, whereby the cups are blown up the elevator tube more or less in random fashion. It has been found that the location of the air jet 186 as shown is preferable. The jet is operative in other locations, but if displaced appreciably to the left (FIG. 12) it tends to damage the cups, and if it is placed in a higher location, as somewhere in the elevator tube 184, it blows the cups up the elevator tube too powerfully.

At the top of the elevator tube 184, there is a U-shaped connecting section 188 leading to a distribution chamber 190. The distribution chamber 190, as best seen in FIG. 11, is provided with two diagonally disposed jets 192, each aimed toward a wire mesh conduit 194. The jets 192 are activated alternatively by means of a suitable timing apparatus, whereby cups raised up through the elevator tube 184 are alternatively directed to one side or the other, through one or the other of the conduits 194.

The conduits 194 respectively angle downwards to one of a pair of troughs 44b constructed and arranged similar to the troughs 44 previously described, and including conveyor belts. Most of the details of construction of the troughs and associated parts are substantially identical with those heretofore shown and described and many of the details are omitted, including the blow-back nozzles or pipes, since their presence will be obvious. The major difference is that the plastic canopy and depending strips or ribbons are omitted. Instead, the entire length of each trough is covered by a screen or wire mesh hood or canopy 196, whereby the cups can be blown up into the air by the jets 98b in the turbulent air zone, and can be returned by the first and second blow-back nozzles and the like without the possibility of being blown away from the troughs.

The two troughs terminate in discharge ends at 52b, comprising funnels as heretofore disclosed, the funnels leading into pneumatic conveyor tubes 54b similar to those heretofore set forth. The conveyor tubes 54b are provided with slots 172b relatively toward their terminal ends, and are somewhat reduced in diameter or choked adjacent the terminal ends to slow the cup travel at this point. The cups are stacked in oriented position in a horizontal stacker tube 198 at the end of each tube 54b.

In the present instance, the cups are fed through the tube 54b bottom end first. To this end, and as will be seen in FIG. 10, the flipper is omitted at the entrance to the funnel 52b, whereby the cups simply pass over the lip of the funnel, and drop bottom down thereinto as they are released by the belts. In instances in which it is desired to feed the cups into a rim rolling machine, the flipper or tipping member is provided, so that the cups will be fed open end first.

The embodiments of the invention as herein shown and described will be understood as being for illustrative purposes only. Various changes in structure will no doubt occur to those skilled in the art, and will be understood as forming a part of this invention insofar as they fall within the spirit and scope of the appended claims.

The invention is claimed as follows:

1. Apparatus for orienting open-ended containers fabricated of light weight sheet material comprising mechanical conveyor means for feeding such containers with the open ends thereof oriented in a predetermined direction, means for supplying said containers in random position to said feednig means, and means adjacent said mechanical conveyor feeding means, establishing fluid flow generally in said predetermined direction and substantially transverse of said mechanical conveyor feeding means for catching within and against the open ends and sides of containers oriented with their open ends other than in said predetermined direction to turn said containers to a positon with their open ends toward said predetermined direction.

2. Apparatus for orienting open-ended containers fabricated of light weight sheet material comprising horizontal feeding means for feeding such containers transverse of their axes along a horizontal path with the open ends thereof disposed upwards, means for supplying said containers in random position to said feeding means, and means adjacent said feeding means establishing an upward fluid flow adjacent and upwards of said feeding means for catching within and against the open ends and sides of containers oriented with their open ends other than upwards to turn said containers to a position with their open ends upwards.

3. Apparatus as set forth in claim 2 wherein the means for establishing fluid flow comprises means substantially symmetrically disposed on opposite sides of the feeding means and directed up from and over said feeding means.

4. Apparatus for orienting open ended containers fabricated of light weight sheet material comprising mechanical conveyor means for feeding such containers along a horizontal path with the open ends thereof disposed upwards, means for supplying said containers in random position to said feeding means, and means on opposite sides thereof directed up from and over said feeding means establishing an upward fluid flow and catching within and against the open ends and sides of containers oriented with their open ends other than upwards to turn said containers to a position with their open ends upwards.

5. Apparatus as set forth in claim 4 and further including guide means disposed adjacent and above said mechanical conveyor means for properly centralizing containers relative to said conveyor means.

6. Apparatus as set forth in claim 4 and further including fluid feed means disposed adjacent said mechanical conveyor means and aimed upstream relative thereto for displacing improperly disposed containers from said mechanical conveyor means and returning such containers upstream of said conveyor means for proper orientation by said fluid flow means.

7. Apparatus for orienting open ended containers fabricated of light weight sheet material comprising mechanical conveyor means for feeding such containers with the open ends thereof oriented up, means for supplying said containers in random position to said mechanical conveyor feeding means, elevator means for raising containers in random position from a lower position up to said supplying means, and means adjacent said feeding means establishing an upward fluid flow for catching within and against the open ends and the sides of containers oriented with their open ends other than in said predetermined direction to turn said containers to a position with their open ends toward said predetermined direction.

8. Apparatus as set forth in claim 7 wherein the elevator is mechanical.

9. Apparatus as set forth in claim 7 wherein the elevator raises the containers by means of an upward fluid flow.

10. Apparatus for orienting open-ended containers fabricated of light weight sheet material comprising a plurality of substantially parallel means for feeding such containers with the open ends thereof oriented in a predetermined direction, means for receiving a plurality of said containers in random position, means for dividing and delivering said containers in substantially equal numbers to said plurality of feeding means in random position, and means adjacent each of said feeding means establishing fluid flow generally in said predetermined direction for catching within and against the open ends and sides of containers oriented with their open ends other than in said predetermined direction to turn said containers with their open ends toward said predetermined direction.

11. Apparatus as set forth in claim 10 wherein the means for dividing these containers into separate feeding means comprises a plurality of rotary members rotating about parallel, spaced apart axes and each having a plurality of substantially radial, relatively soft and flexible extensions therein engageable with containers for guiding and moving thereof.

12. Apparatus as set forth in claim 10 wherein the dividing means comprises a plurality of fluid pressure devices aimed in different directions, and sequentially operable to direct containers into different ones of said feeding means in sequence.

13. Apparatus for orienting open-ended containers fabricated of light weight sheet material comprising a trough having downwardly converging side walls spaced apart at the bottom thereof, means providing a throat below said side walls, conveyor belt means adjacent said throat and adapted to feed such open-ended containers with the open ends thereof disposed upwardly, and fluid pressure jet means adjacent the junctions of said side walls and said throat providing means on opposite sides of said throat and directed toward one another and upwardly whereby to provide an upwardly directed fluid area tending to dispose said containers with their open ends upwards.

14. Apparatus as set forth in claim 13 and further including a manifold on each side of said throat defined in part by the converging walls and means providing the throat, said manifold having apertures therein exiting adjacent the bottom of said converging walls for emitting fluid under pressure from said manifolds.

15. Apparatus as set forth in claim 13 wherein the means providing the throat comprises a pair of spaced apart substantially vertical side walls depending from said converging walls at the bottom edges thereof, and wherein said conveyor belt means is positioned at the bottom of said substantially vertical side walls.

16. Apparatus as set forth in claim 15 wherein the conveyor belt means comprises a pair of conveyor belts disposed on opposite sides of said throat and having opposed reaches adapted to engage and carry containers between them.

17. Apparatus as set forth in claim 14 and further including fluid pressure means discharging substantially in said throat in the direction of feed of containers therethrough substantially at the entering end of said trough.

18. Apparatus for orienting open-ended containers fabricated of light weight sheet material comprising a trough having a pair of downwardly converging side walls spaced apart at their lower edges, means providing a throat adjacent said lower edges of said side walls, conveyor means adjacent said throat for engaging and feeding containers oriented with their open ends upwards, means for supplying containers in random position to said trough, a cover overlying said trough and having means for permitting passage of fluid under pressure outwardly therefrom, and means adjacent the lower edges of said converging side walls establishing fluid pressure inwardly and upwardly from both sides of said throat to provide a turbulent upward fluid area adjacent said throat tending to position said open-ended containers with their open ends upwards, said cover overlying said troughs preventing said containers from being blown completely away from said trough.

19. Apparatus as set forth in claim 18 and further including means disposed adjacent said throat downstream from the entering end of said trough and discharging fluid under pressure back toward the entering end of said trough whereby to catch and blow back toward said entering end the improperly oriented containers.

20. Apparatus as set forth in claim 19 and further including additional fluid pressure means adjacent said throat and located further downstream for discharging fluid under pressure back toward the entering end of said trough for blowing back improperly oriented containers toward the said entering end.

21. Apparatus as set forth in claim 19 wherein the cover extends over only a part of the length of said trough, the means establishing upward fluid pressure being disposed beneath said cover, said cover at the downstream end thereof being provided with a plurality of depending strips of material resisting passage of containers out from under said cover except when carried by said conveyor belt means, the means for blowing containers back being outside said cover, containers blown back thereby having a substantial horizontal velocity component and readily passing through said strips into the area of upward fluid pressure.

22. Apparatus as set forth in claim 18 wherein the conveyor belt means comprises two sets of conveyor belts in succession, each set of conveyor belts comprising a conveyor belt on each side of said throat, the belts of each set having opposed reaches adapted to engage and carry between them a container the second set of conveyor belts being disposed downstream of the first set and at a lower elevation whereby containers drop from the first set of conveyor belts to the second set of conveyor belts thereby tending to orient any improperly oriented containers.

23. Apparatus for orienting open-ended containers fabricated of light weight sheet material comprising a trough having downwardly converging side walls, means at the bottom of said side walls providing a throat, conveyor belt means adjacent said throat for conveying containers oriented with their open ends upwards, pneumatic jet means adjacent said throat on opposite sides thereof and discharging inwardly and upwardly in opposition to one another for establishing a turbulent upward pneumatic zone to orient containers with their open ends upwards, means for supplying containers in random position to said trough at the entering end thereof, and pneumatic conveyor means at the discharge end of said trough for receiving containers from said conveyor belt means.

24. Apparatus as set forth in claim 23 and further including blow back jet means adjacent the entrance to said pneumatic conveyor means for blowing back improperly oriented containers toward said pneumatic upward zone.

25. Apparatus as set forth in claim 23 and further including means adjacent the receiving end of said pneumatic conveyor means for detecting piled up containers, and means operated by said detecting means to reverse the pneumatic blow through said pneumatic conveyor means to blow such improper containers upwardly away from said pneumatic conveyor means.

26. Apparatus as set forth in claim 23 wherein the pneumatic conveyor means is disposed below the conveyor belt means, and containers drop open end up from said conveyor belt means into said pneumatic conveyor means.

27. Apparatus as set forth in claim 23 wherein the pneumatic conveyor means is disposed below the conveyor belt means, and further including a barrier engaging the lower portions of containers as they pass from said conveyor belt means to said pneumatic conveyor means, whereby said containers are tipped over and pass into said pneumatic conveyor means open end first.

28. Apparatus as set forth in claim 23 wherein the pneumatic conveyor means includes means for swirling air therethrough, whereby to rotate said containers as they are fed through said pneumatic conveyor means.

29. Apparatus as set forth in claim 23 wherein the conveyor belt means comprises opposed conveyor belts dependingly supporting said containers, and further including a barrier intermediate the ends of said trough over which containers are tipped by said opposed belts, whereby to space apart containers carried by said belts.

30. Apparatus for orienting open-ended containers fabricated of lightweight, sheet material, comprising means for feeding a plurality of such containers substantially transversely on their axes in substantially upright position with the open ends up along a predetermined path, means for supplying said containers in random fashion to said feeding means from a position above same, and means adjacent said feeding means establishing a turbulent upward fluid flow adjacent and above said feeding means tending to position said open-ended containers with their open ends upwards.

31. Apparatus as set forth in claim 30 wherein the means establishing a turbulent upward fluid flow comprises fluid jet means disposed on opposite sides of said predetermined path and aimed upwardly and inwardly toward sai path at least partially in opposition to one another.

32. Apparatus set forth in claim 30 and further including a cover overlying said predetermined path in the area of said turbulent upward fluid flow preventing said containers from being completely blown away from said feeding means.

33. Apparatus for stacking cups and the like comprising endless belt conveyor means having substantially horizontally disposed reach means with an inlet end and an outlet end, means for supplying cups to said endless belt conveyor means adjacent said inlet end with the cup axes substantially vertical and a given end up, cup stacking pneumatic chute means having a receiving end adjacent said outlet end of said endless belt conveyor means and having at least said receiving end maintained at reduced pressure to suck cups into said chute means, and a barrier between said endless belt conveyor means outlet end and said cup stacking chute means engageable with the lowermost portions of cups carried by said endless belt conveyor means and over which said cups tip to enter said stacking chute means with said given end foremost.

34. Apparatus for stacking cups and the like comprising means providing a loading surface, means for supplying cups to said loading surface in multiple fashion, cup conveying means including endless belt conveyor means, means including rotary sorting means delivering said cups from said surface to said cup conveying means in single file succession, and pneumatic tube conveying means receiving said cups in single file succession from said cup conveying means for removal to a cup receiving station.

References Cited in the file of this patent

UNITED STATES PATENTS

| | | |
|---|---|---|
| 676,761 | Morris | June 18, 1901 |
| 1,238,895 | Dempsey | Sept. 4, 1917 |
| 1,556,469 | Alderman | Oct. 6, 1925 |
| 2,491,778 | Smith | Dec. 20, 1949 |
| 2,734,657 | Drese | Feb. 14, 1956 |
| 2,764,274 | Yirswold | Sept. 25, 1956 |
| 2,790,532 | Albertoli | Apr. 30, 1957 |
| 2,912,282 | Schult | Nov. 10, 1959 |
| 3,012,651 | Hawkes | Dec. 12, 1961 |